United States Patent [19]

Gross et al.

[11] Patent Number: 4,943,596
[45] Date of Patent: Jul. 24, 1990

[54] HIGH STRENGTH SILICONE FOAM, AND METHODS FOR MAKING

[75] Inventors: David C. Gross, Schenectady, N.Y.; Connie L. Haig, Evansville, Ind.; Jonathan D. Rich, Rexford, N.Y.

[73] Assignee: General Electric Company, Schenectady, N.Y.

[21] Appl. No.: 274,536

[22] Filed: Nov. 21, 1988

Related U.S. Application Data

[62] Division of Ser. No. 189,082, May 2, 1988, Pat. No. 4,810,728.

[51] Int. Cl.$^5$ ................................................ C08J 9/06
[52] U.S. Cl. ........................................ 521/82; 521/86; 521/88; 521/92; 521/134; 521/154; 525/477; 528/15; 528/32
[58] Field of Search ...................... 521/82, 86, 88, 92, 521/134, 154; 525/477; 528/15, 32

[56] References Cited

U.S. PATENT DOCUMENTS

| | | | |
|---|---|---|---|
| 4,480,009 | 10/1984 | Berger | 428/447 |
| 4,499,149 | 2/1985 | Berger | 428/447 |
| 4,690,997 | 9/1987 | Cella et al. | 528/26 |

*Primary Examiner*—Morton Foelak
*Attorney, Agent, or Firm*—William A. Teoli; James C. Davis, Jr.; William H. Pittman

[57] ABSTRACT

Silicone foams are provided which have increased tensile strength as the result of using an effective amount of a silicone polyimide block copolymer having chemically combined organovinylsiloxy units in the silicone block.

2 Claims, No Drawings

HIGH STRENGTH SILICONE FOAM, AND METHODS FOR MAKING

This application is a division of application Ser. No. 189,082, filed May 2, 1988, now U.S. Pat. No. 4,810,728.

BACKGROUND OF THE INVENTION

Prior to the present invention, various methods were available to make silicone foam which is used as a thermal and electrical insulator, a flame barrier, or in cushioning applications. Although elastomeric silicone foams have excellent physical properties, their use has been somewhat restricted since these materials are generally more expensive than the corresponding organic foams. In an effort to overcome the cost disadvantages of silicone foams over organic foams, silicone foam manufacturers are constantly developing techniques for reducing the density of the silicone foam while trying to maintain the strength of the fabricated structure. One method of reducing silicone foam density, while maintaining strength is shown by Modic, U.S. Pat. No. 4,418,157. Other procedures are constantly being developed to further reduce the cost advantages of silicone foams with respect to organic foams.

The present invention is based on the discovery that a silicone foam having reduced foam density can, nevertheless, be made with a satisfactory degree of tensile strength by incorporating into the foamable mixture an effective amount of a silicone polyimide where the silicone block in the silicone polyimide has chemically combined methylvinyl siloxy units.

STATEMENT OF THE INVENTION

There is provided by the present invention, a silicone foam composition comprising by weight
(A) 100 parts of a vinyl-terminated polydiorganosiloxane fluid,
(B) 1–70 parts of a silicone polyimide block copolymer having from 1 to 75% by weight of chemically combined methylvinylsiloxy units based on the weight of the silicone polyimide block copolymer,
(C) 1 to 50 parts of a siloxane hydride,
(D) 0.2 to 10 parts of a hydroxylated material selected from the class consisting of water, $C_{(1-8)}$ alkanols, silanols, and mixtures thereof, in an amount to provide a mole ratio of from about 0.02 to about 15 moles of hydroxyl radicals per silicon bonded hydrogen, of the siloxanehydride of (C), and
(E) from about 1 to about 250 parts per million of catalytic platinum metal.

The vinyl-terminated polydiorganosiloxane fluid, or component (A) in the Statement of the Invention can have a viscosity from about 100 to about 1,000,000 centipoise at 25° C. and preferably from about 2500 to 500,000 centipoise. The vinyl-substitution can range of from about 0.0002 to 3% by weight, and preferably from about 0.001 to about 1% by weight of the vinyl-terminated polydiorganosiloxane. The vinyl-terminated polydiorganosiloxane is preferably terminated with vinyldiorganosiloxy units, and the organo radicals of the vinyl-terminated polydiorganosiloxane are selected from $C_{(1-20)}$ monovalent hydrocarbon radicals or $C_{(1-20)}$ monovalent hydrocarbon radicals substituted with radicals inert during equilibration.

There are included by the organo radicals of the vinyl-terminated polydiorganosiloxane alkyl radicals such as methyl, ethyl, propyl, etc.; cycloalkyl radicals, such as cyclohexyl, cycloheptyl, etc.; haloalkyl radicals such as trifluoropropyl; aryl radicals, for example, phenyl, tolyl, xylyl, naphthyl; haloaryl radicals such as chlorophenyl, comotolyl, nitrophenyl, etc.; alkenyl radicals such as vinyl, allyl. It is preferred that the organo radicals are selected from methyl, phenyl, vinyl, and 3,3,3-trifluoropropyl.

The vinyl-terminated polydiorganosiloxanes are well-known in the art and can be made, for example, by equilibrating cyclic polydiorganosiloxanes with or without vinyl substitution in the presence of appropriate amount of a vinyl chain-stopper such as a 1,3-divinyl tetraorganodisiloxane. Further details for making vinyl-substituted polydiorganosiloxanes can be found in Modic, U.S. Pat. No. 3,425,967 incorporated herein by reference.

The vinyl-containing silicone polyimide block copolymer shown by (B) can be made by initially forming a silicone polyimide in accordance with the teaching of Cella et al., U.S. Pat. No. 4,690,997, incorporated herein by reference. There is utilized an aromatic bisanhydride which is intercondensed with amine-terminated polydiorganosiloxane and aryldiamine to produce a silicone polyimide. Some of the aromatic dianhydrides which can be used in forming the silicone polyimide are, for example, 2,2'-bis[4-(2,3-dicarboxyphenoxy)phenyl]propane dianhydride;
4,4'-bis(2,3-dicarboxyphenoxy)diphenyl ether dianhydride;
1,3-bis(2,3-dicarboxyphenoxy)benzene dianhydride;
4,4'-bis(2,3-dicarboxyphenoxy)diphenyl sulfide dianhydride;
1,4-bis(2,3-dicarboxyphenoxy)benzene dianhydride;
4,4'-bis(2,3-dicarboxyphenoxy)diphenylsulfone dianhydride, etc.;
2,2-bis[4-(3,4-dicarboxyphenoxy)phenyl]propane dianhydride;
4,4'-bis(3,4-dicarboxyphenoxy)diphenyl ether dianhydride;
4,4'-bis(3,4-dicarboxyphenoxy)diphenyl sulfide dianhydride;
1,3-bis(3,4-dicarboxyphenoxy)benzene dianhydride;
1,4-bis(3,4-dicarboxyphenoxy)benzene dianhydride;
4,4'-bis(3,4-dicarboxyphenoxy)diphenylsulfone dianhydride;
4-(2,3-dicarboxyphenoxy)-4'(3,4-dicarboxyphenoxy)-2,2-diphenylpropane dianhydride, etc.

The preferred aromatic dianhydrides are aromatic bis(ether anhydrides). There also can be used other organic dianhydrides in combination with such aromatic bis(ether anhydrides) to make the silicone-polyimide wire coating compositions of the present invention. These organic dianhydrides can be used at up to 50 mole percent based on total dianhydride and include pyromellitic dianhydrides, benzophenone dianhydride and 5,5'-(1,1,3,3-tetramethyl-1,1,3-disiloxanedilyl-bis-norbornane-2,3-dicarboxylic dianhydride.

Among the aryl diamine which can be employed to make the siliconepolyimide block copolymer are, for example:
m-phenylene diamine;
p-phenylenediamine;
4,4'-diaminodiphenylpropane;
4,4-diaminodiphenylmethane;
benzidine;
4,4'-diaminodiphenyl sulfide;
4,4'-diaminodiphenyl sulfone;

4,4'-diaminodiphenyl ether;
1,5'-diaminonaphthalene;
3,3'-dimethylbenzidine;
3,3'-dimethoxybenzidine;
2,4-bis(β-amino-t-butyl)toluene;
bis(p-β-amino-t-butylphenyl)ether;
1,3'-diamino-4-isopropylbenzene;
1,2-bis(3-aminopropoxy)ethane;
m-xylylenediamine;
2,4-diaminotoluene;
2,6-diaminotoluene.

The organo radicals of the amine-terminated polydiorganosiloxane have the same organo radicals as defined for the vinyl-terminated polydiorganosiloxane of (A) and have an average of from about 3-20 chemically combined diorganosiloxy units and terminated with $C_{(1-14)}$ hydrocarbon amine units, where the hydrocarbon radical is a divalent radical and selected from $C_{(1-8)}$ alkylene radicals such as methylene, ethylene, propylene, butylene, or arylene radicals such as phenylene, tolylene, xylene, etc.

In addition to the above-described reactants to make the silicone polyimide, there also can be utilized organic anhydride chain-stoppers such as phthalic anhydride to control the molecular weight of the silicone polyimide block copolymer. It is preferred to incorporate vinyl organosiloxy units into the aforementioned silicone block of the silicone polyimide by equilibrating the silicone polyimide with additional cyclic siloxane including cyclic siloxane having chemically combined vinyl organosiloxy units. The equilibration can be effected in accordance with standard techniques using an effective amount of an equilibration catalyst such as 0.1 to 5.0% by weight of equilibration catalyst based on the weight of the equilibration mixture and preferably 0.25 to 2% by weight. Equilibration catalysts which can be used are, for example, triflic acid, methane sulfonic acid, sulfuric acid, benzene sulfonic acid, Nafion resin, or acidic clays. The equilibration can be effected at temperatures in the range of from 20° C. to 100° C. After the equilibration is completed, which can be achieved by agitating the mixture over a period of from 0.5 to 12 hours, there can be added neutralizing agents such as magnesium oxide to quench the catalyst. Recovery of the vinyl-containing silicone polyimide can be achieved by filtering and devolatizing the mixture.

The siloxanehydride (C) utilized in the practice of the present invention to make the silicone foam-forming compositions has a hydrogen content ranging from about 0.3 to about 1.6% by weight of hydrogen based on the weight of the siloxanehydride and a viscosity ranging from about 1 to 500 centipoise at 25° C. Preferably the siloxanehydride consists essentially of chemically combined organosiloxy units having silicon-bonded hydrogen atoms attached to silicon to form the backbone of the polysiloxane chain. Optionally, hydrogen atoms attached to silicon also can be present on the chain-stopping units.

In addition to the siloxanehydride, the silicone-foam compositions of the present invention require a source of hydroxy radicals in the form of a hydroxylated material, as previously defined. In order to provide for effective foaming results, there can be used sufficient hydroxylated material to provide from about 0.02 to about 15 gram equivalents of hydroxy radicals, per gram equivalent of silicon-bonded hydrogen atoms of the siloxane hydride. Preferably, there can be used from about 0.2 to about 10 gram equivalents of hydroxy radicals while 0.5 to about 7 gram equivalents of hydroxy radicals per silicon-bonded hydrogen will provide optimum results.

Among the hydroxylated materials which can be used in the practice of the present invention, there can be used hydroxylated silicones such as silanols which can be in the form of homopolymers, copolymers, or mixtures thereof. It is preferred that the silanol contain at least one organic radical in a molecule per silicon atom. For example, there can be used silanol-terminated polydimethylsiloxane as well as silanol-terminated siloxane having chemically combined dimethylsiloxy units, methylphenylsiloxy units, and methyl-3,3,3-trifluoropropylsiloxy units. Also included are mixtures of hydroxylated organosiloxane polymers and hydroxylated organosilanes such as mixtures of hydroxy and end-block polydimethylsiloxane and diphenylmethylsilanol.

In addition to silanols, organic alcohols also can be used which are monohydric or polyhydric alcohols having from about 1-12 carbon atoms. Preferably, there can be used ethanol, propanol, butanol, lauryl alcohol, octyl alcohol, and ethyleneglycol. Combinations of silanols, water, and organic alcohols also have been found to be effective. Additional aspects of the use of the hydroxylated material in the reduction of silicone foams of the present invention can be found in U.S. Pat. Nos. 4,189,545; 4,418,157; 4,599,367; and 3,923,705.

Platinum catalysts which can be used in the practice of the present invention in making the silicone foam compositions are, for example, reaction products of an olefin and chloro platinic acid as described in Ashby, U.S. Pat. No. 3,159,601, or the reaction product of platinic chloride and cyclopropane as described in Ashby, U.S. Pat. No. 3,159,662. Further platinum complexes which can be used as the platinum catalyst are reaction products of chloroplatinic acid with up to 2 moles, per gram of platinum of a member selected from the class consisting of alcohols, ethers, aldehydes and mixtures thereof, as shown in Lamoreaux, U.S. Pat. No. 3,220,972. The preferred platinum catalyst is shown by Karstedt, U.S. Pat. No. 3,775,452, which is formed by reacting chloroplatinic acid with tetramethyltetravinylcyclosiloxane in the presence of sodium bicarbonate in an ethanol solution. There can be used from about 1 to 250 parts per million. It has been found that effective results can be achieved if sufficient platinum catalyst is employed in the silicone foamable composition to provide from 1 to 250 parts per million of platinum, preferably from 1 to 200 parts of platinum per million parts of mixture.

In addition to the aforementioned basic ingredients, the silicone foam composition can contain from 1 to 200 parts by weight of a filler per hundred parts of foam composition. It is preferred to use extending fillers or reinforcing fillers such as fumed silica and precipitated silica can be used in instances where it is desired to increase the physical properties such as the tensile strength and tear strength of the resulting elastomeric silicone foam. Other extending fillers which may be utilized are, for example, titanium dioxide, lithopone, zinc oxide, zirconium silicate, silica airogel, iron oxide, diatomaceous earth, calcium carbonate, glass fibers, magnesium oxide, chromic oxide, zirconium oxide, aluminum oxide, α-quartz, clay, carbon, and graphite. In order to minimize the viscosity increase generally experienced when using reinforcing fillers, it can be heat treated with cyclic polysiloxanes or silazanes. A preferred filler in the practice of the present invention is ground quartz which has been found to enhance the burn-resistant properties of the composition as well as imparting some enhanced physical properties to the final cured silicone foam.

The silicone foam compositions of the present invention are generally used and stored as a two-part composition. The platinum catalyst is preferably incorporated in the vinyl-containing polysiloxane. Hydroxyl source also can be added to the vinyl-containing polysiloxane along with the silicone polyimide block copolymer and the filler.

In forming the silicone foam, the siloxanehydride (Part A) is rapidly mixed with the vinyl-containing siloxane mixture (Part B) containing the hydroxy source material and platinum catalyst and the silicone polyimide block copolymer. The resulting composition can be poured into a cavity and allowed to stand. The composition thereafter will begin to cross-link and generate gas simultaneously resulting in a cured elastomeric silicone foam having a density of less than 20 pounds per cubic foot.

If desired, an inhibitor, such as diallylmaleate or methylethylketone peroxide, or dimethylacetylenedicarboxylate, can be added to the compositions at a concentration of anywhere from 100 parts to 10,000 parts, per million parts based on total composition to increase the worklife of the curable silicone mixture.

In addition to the aforementioned silica fillers, there also can be used additional additives such as carbon black, pigment, glass fibers, etc. In addition, additives such as MQ or MQD resins can be added to lower density, increase strength as described in U.S. Pat. No. 4,418,157, incorporated herein by reference.

In order that those skilled in the art will be better able to practice the present invention, the following examples are given by way of illustration and not by way of limitation. All parts are by weight.

EXAMPLE 1

A silicone polyimide block copolymer was prepared by intercondensing a mixture of 49 mole percent of 2,2-bis[4-(3,4-dicarboxyphenoxy)phenyl] propanedianhydride, 18.75 mole percent of an aminopropyl-terminated polydimethylsiloxane having an average degree of polymerization of 9, 31.25 mole percent of metaphenylenediamine and 2 mole percent of phthalic anhydride.

A solution of 30.3 grams of the above silicone polyimide in 1,2-dichloroethane was dried by azeotropic distillation to reduce the solvent volume to 76.16 grams. There was added to the mixture, 0.3 gram of triflic acid and 10 grams of octamethylcyclotetrasiloxane and the mixture was maintained at reflux with stirring for approximately two hours. The mixture was then allowed to cool to room temperature and 10 grams of 1,3,5,7-tetravinyltetramethylcyclotetrasiloxane was added. The resulting mixture was then stirred over a period of 12 hours. Magnesium oxide was then added to quench the acid catalyst. Excess methylene chloride was added and the solid filtered. Volatiles were removed by rotovap. Based on method of preparation and $^{29}Si$ NMR spectrum, the resultant pale yellow solid was a silicone polyimide having a silicone block having an average of about 25 chemically combined siloxy units consisting essentially of dimethylsiloxy units and about 30 mole percent of methylvinylsiloxy units.

A mixture of 10 grams of the above vinyl-containing silicone polyimide, 20 grams of a dimethylvinyl-terminated polydimethylsiloxane having a viscosity of about 3500 centipoise and 500 parts of methylenechloride was stirred for 48 hours under a nitrogen stream. There was obtained a fine suspension of the silicone polyimide in the silicone fluid. Residual methylenechloride was removed by vacuum. The mixture was then centrifuged in a sufficient quantity and the silicone fluid was withdrawn to form a suspension having a viscosity of about 50,000 centipoise.

There was blended 5 grams of the above suspension with 0.05 gram of methanol and 100 ppm of platinum catalyst in the form of a platinum vinylsiloxane made in accordance with the aforementioned Karstedt method. There was then added to the resulting blend with stirring 0.05 gram of a mixture of 2 parts of a trimethylsilyl-terminated polymethylhydrogen siloxane having a viscosity of 10-20 centipoise and 1 part of a dimethylvinyl-terminated polydimethylsiloxane with a viscosity of 75,000 to 90,000 centipoise. A reaction occurred and the mixture rose and Gelled in approximately 1 minute. A silicone foam having a fine cell structure was obtained having a density of 18 lbs/ft$^3$.

EXAMPLE 2

A mixture of 9.9 grams of the silicone polyimide of Example 1, 100 grams of methylenechloride, 200 parts of a dimethylvinyl-terminated polydimethylsiloxane having a viscosity of about 75,000 centipoise, 34 parts of a resin consisting of chemically combined trimethylsiloxy units, tetrasiloxy units, and methylvinylsiloxy units, where the ratio of trimethylsiloxy units to siloxy units was 0.7, 39 parts of a dimethylvinyl-terminated polydimethylsiloxane having a viscosity of about 3500 centipoise and 12 parts of the aforementioned dimethylsiloxy resin was stirred at 60° C. under vacuum to remove the methylenechloride from the system.

There was added to 10.03 grams of the above silicone blend, 0.3 grams of water and 0.033 gram of platinum catalyst as a 5 weight percent solution in xylene and the resulting mixture was further blended with a metal spatula. There was then added to the resulting blend about 1.8 part of a trimethylsilyl-terminated polymethylhydrogen siloxane consisting of methylhydrogen siloxy units and chain-stopped with trimethylsiloxy units having a viscosity of about 10-20 centistokes. This blend was mixed with about 0.9 gram of the aforementioned dimethylvinyl-terminated polydimethylsiloxane having a viscosity of about 75,000 centipoise. The resulting mixture was rapidly stirred and poured into a 50 ml container resulting in the production of a tack-free foam in about 6 minutes.

Additional foamable mixtures were prepared following the same procedure and the following results were obtained where DMVA is a dimethylvinylsiloxy-terminated polydimethylsiloxane fluid having a viscosity of about 75,000 centipoise, DMVB is a dimethylvinylsiloxy fluid having a viscosity of about 3500 centipoise, MQD is a trimethylsiloxy-stopped resin having methylvinylsiloxy units and a ratio of about 0.7 trimethylsiloxy units per siloxy unit, MH is a trimethylsiloxy-terminated polymethylhydrogen siloxane, SPI is the vinyl-containing silicone polyimide made in accordance with Example 1, and all of the parts as shown are in grams except as otherwise indicated:

TABLE I

| DMVA | DMVB | MQD | MH | H₂O | SPI | Pt (ppm) | Gel Time (min) | Density (#/ft) |
|---|---|---|---|---|---|---|---|---|
| 11.2 | 3.9 | 5.0 | 1.75 | 0.3 | 1 | 80 | 12 | 17.2 |
| 11.1 | 3.9 | 5.0 | 1.75 | 0.3 | 1 | 160 | 5 | 15.1 |
| 11.5 | 4.0 | 5.1 | 1.79 | 0.3 | 0.5 | 80 | 6 | 15.0 |
| 11.5 | 4.0 | 5.1 | 1.79 | 0.3 | 0.5 | 160 | 1.5 | 15.1 |
| 11.2 | 3.9 | 5.1 | 1.32 | 0.3 | 0.5 | 100 | 2.5 | 15.3 |
| 11.3 | 4.0 | 5.1 | 1.32 | 0.3 | 0.25 | 80 | — | 15.6 |

The above results show that a Gel time can be reduced by increasing the concentration of platinum, while reducing the concentration of the methylhydrogen fluid.

EXAMPLE 3

A mixture of 15 grams of the dimethylvinyl-terminated polydimethylsiloxane having a viscosity of about 75,000 centipoise, 3 grams of a dimethylvinyl-terminated polydimethylsiloxane having a viscosity of about 3500 centipoise, 6.3 grams of a trimethylsiloxy-terminated resin having chemically combined methylvinylsiloxy units in a ratio of 0.7 trimethylsiloxy units to siloxy units, and 13.95 grams of a 16.2 weight percent solution in methylenechloride of the silicone polyimide of Example 1 mixed and heated under vacuum to disperse the silicone polyimide in the silicone resin. There was then added to the resulting blend, about 0.45 gram of water, 100 parts per million of platinum using the platinum catalyst of Example 1, and 1.3 grams of a trimethylsiloxy-terminated polymethylhydrogensiloxane and having a viscosity of about 10-20 centipoise. The volatile mixture was spread out to a standardized Teflon ® mold and allowed to foam. A tack-free foam was obtained in about 10 minutes time. The same procedure was repeated except that a quartz and calcium carbonate was substituted for the silicone polyimide. The following results were obtained where DMVA, DMVB, MQD, and MH are as shown in Table I:

TABLE II

| Components (grams) | Commercial Foam | Silicone Polyimide |
|---|---|---|
| Foamable Compositions | | |
| DMVA | 42.6 | 50.9 |
| DMVB | 14.8 | 17.9 |

TABLE II-continued

| Components (grams) | Commercial Foam | Silicone Polyimide |
|---|---|---|
| MQD | 19 | 23 |
| α-quartz | 25 | — |
| CaCO₃ | 2 | — |
| Pt | 40 ppm | 100 ppm |
| H₂O | 1.5 | 2 |
| Silicone Polyimide | — | 10 |
| MH | 6.6 | 6.6 |
| Properties | | |
| Gel Time (min) | 4 | 10 m |
| Density (lb/ft³) | 15 | 17-18 |
| Tensile (lb/in²) | 40+ − 4.4 | 159+ − 12.5 |
| Elongation (%) | 143+ − 7.5 | 105+ − 4.5 |

The above results show that the silicone polyimide containing foamable composition of the present invention provides significantly higher strength to the foam as compared to the commercially available foams reinforced with fillers such as α-quartz or calcium carbonate.

Although the above results are directed to only a few of the very many variables which can be employed in the practice of the method of the present invention, it should be understood that the present invention is directed to a much broader variety of silicone foams and methods for making such foams shown in the description preceding these examples.

What is claimed and sought to be protected by Letters Patent of the United States is as follows:

1. A method for making a high strength silicone foam, which comprises mixing a siloxane hydride with a mixture comprising a vinyl-containing siloxane, a hydroxy source material, an effective amount of a platinum catalyst, and a silicone polyimide block copolymer having from 1 to 75% by weight of chemically combined organovinylsiloxy units based on the weight of the silicone polyimide block copolymer.

2. A method in accordance with claim 1, which employs an inhibitor.

* * * * *